Sept. 27, 1955  E. T. ANDREWS  2,718,897

QUICK RELEASE VALVE

Filed April 3, 1953

INVENTOR

Earl T. Andrews

BY

ATTORNEY

2,718,897

QUICK RELEASE VALVE

Earl T. Andrews, Elyria, Ohio, assignor to Bendix-Westinghouse Automotive Air Brake Company, Elyria, Ohio, a corporation of Delaware Application April 3, 1953, Serial No. 346,775

5 Claims. (Cl. 137—102)

This invention relates to relief valves and more particularly to a quick release valve for use in connection with front brake chambers in automotive air brake installations.

In compressed air braking systems for automotive vehicles, it is customary to install a quick release valve in the lines between the front brake chambers and the operator's control valve in order to obtain a quick release of the front brakes when the control valve is moved to exhaust position. One such type of valve is disclosed in the patent of Stephen Vorech No. 2,040,580, dated May 12, 1936, and comprises a flexible diaphragm which is effective to not only control the application of compressed air to the front braking chambers, but to also secure a quick release of air pressure from such chambers when the master control valve is moved to the brake release position. In the valve of the patent, a spring acts upon the diaphragm in such a manner that a pressure differential exists across the diaphragm and this feature results in somewhat slower application of the front brakes as compared with the rear brakes. Moreover when the valve of the patent is in its holding position, the degree of energization of the front brakes is slightly less than that of the rear brakes.

In some instances, it has been found desirable to reduce the differential of brake application between front and rear brakes and it is accordingly one of the objects of the present invention to improve the valve of the aforesaid patent by reducing the pressure differential which exists across the diaphragm thereof when the brakes are being applied or are being held in applied position.

Another object is to provide a quick release valve of the above type wherein the diaphragm is free of initial flexure and though acted upon by a spring, nevertheless cooperates in a novel manner with other parts of the valve to reduce or eliminate any pressure differential across the diaphragm during operation.

A further object is to provide in a valve of the above character, a construction which includes a novel corrugated diaphragm follower cooperable at all times with the marginal edge of the diaphragm for the purpose of reducing or eliminating the aforesaid pressure differential.

Other objects and novel features of the invention will appear more fully hereinafter from the following detailed description when taken in connection with the accompanying drawing which illustrates one form of the invention. It is to be expressly understood however, that the drawing is utilized for purposes of illustration only and is not to be taken as a definition of the limits of the invention, reference being had for this purpose to the appended claims.

In the drawing, wherein similar reference characters refer to similar parts throughout the several views.

Figure 1:
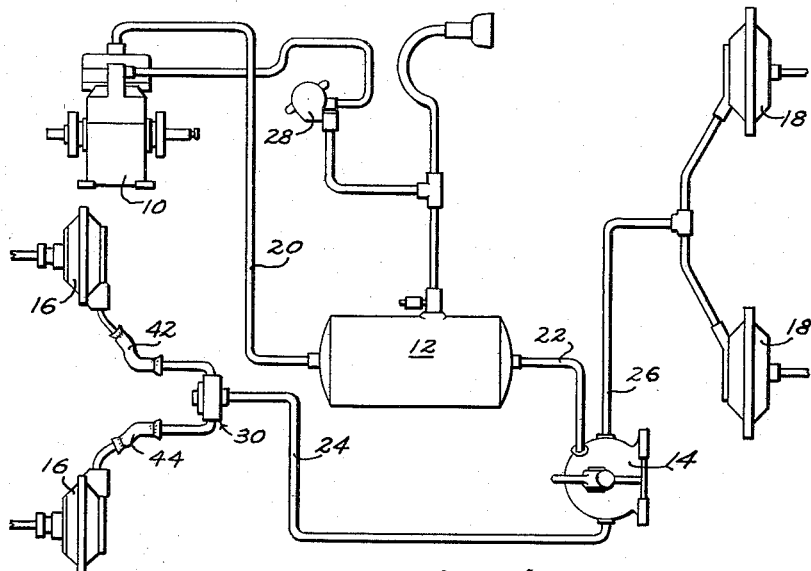
Fig. 1 is a diagrammatic view of a compressed air vehicle braking system having the novel quick release valve of the invention incorporated therein.

Referring more particularly to Fig. 1, the novel quick release valve of the present invention is illustrated therein in connection with a compressed air vehicle braking system of a well known type which includes a compressor 10, a reservoir 12, a master control valve 14 and front and rear brake actuators 16 and 18. As shown, the above components are interconnected by suitable conduits 20, 22, 24 and 26 and a conventional governor 28 is employed for controlling the operation of the compressor in accordance with the pressure of the air within the reservoir 12. The novel quick release valve of the invention is shown at 30 and is interposed between the front brake chambers 16 and the conduit 24 for controlling the application of compressed air to and its exhaust from the front brake actuators 16 in a manner which will appear more fully hereinafter.

Figure 2:
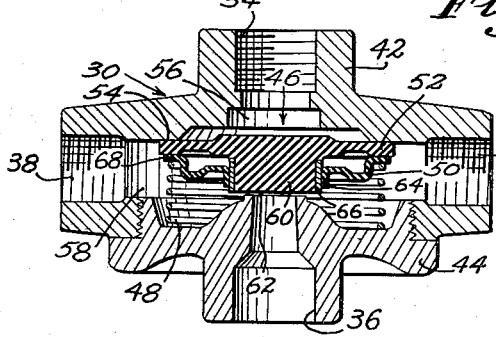
Fig. 2 is a sectional view of the quick release valve.

As shown in Fig. 2, the valve 30 includes a casing having aligned inlet and exhaust ports 34 and 36 and a pair of laterally extending outlet ports 38 and 40, the latter being respectively connected with the front brake chambers 16 by way of hose connections 42 and 44, and the inlet 34 being connected with the conduit 24. Preferably the casing includes two parts 42 and 44 to facilitate assembly of the valve parts which comprise a flexible diaphragm 46, a spring 48 and a novel diaphragm follower 50.

In order to increase the life of the valve and secure uniform action, the diaphragm 46 is made of a suitable flexible material such as reinforced rubber or rubber composition and is free of any initial flexure or stress. The upper portion of the diaphragm is provided with a marginal edge 52 which, as shown in Fig. 2, is resiliently maintained in engagement with a valve seat 54, and thus controls communication between an inlet chamber 56 and an annular outlet chamber 58. The central portion of the diaphragm 46 is enlarged to provide an exhaust valve part 60 which is normally spaced from an exhaust valve seat 62 to enable free communication to be established between the outlet chamber 58 and the exhaust port 36. Thus in the normal position of the parts, the edge 52 forms with the seat 54, a closed inlet valve while the enlarged portion 60 forms an open outlet valve allowing unrestricted communication between the brake chambers 16 and the atmospheric outlet 36.

It will be readily appreciated that with the above construction, and assuming that the spring 48 engages the entire marginal portion 52, of the diaphragm 46, a pressure differential would exist across the diaphragm upon the application of compressed air to the inlet chamber 56. Thus, as the brake valve 14 is operated, compressed air would be conducted to the rear brake chambers 18 prior to the application of the front brake chambers 16 and to a greater degree. The pressure in the rear brake chambers 18 would build up substantially simultaneously with the operation of the brake valve 14 while the pressure delivered to the inlet chamber 56 of the valve 30 would first have to overcome the tension of the spring 48 before the marginal edge 52 of the diaphragm flexed away from the seat 54 and thus opened communication between the inlet chamber 46 and the front brake chambers 16 by way of outlet chamber 58 and outlet ports 38 and 40. However, with the arrangement assumed, the rear brakes would be applied before the front brakes and to a greater degree. Moreover, a pressure differential would exist across the diaphragm 46 of the quick release valve 30.

Figure 3:
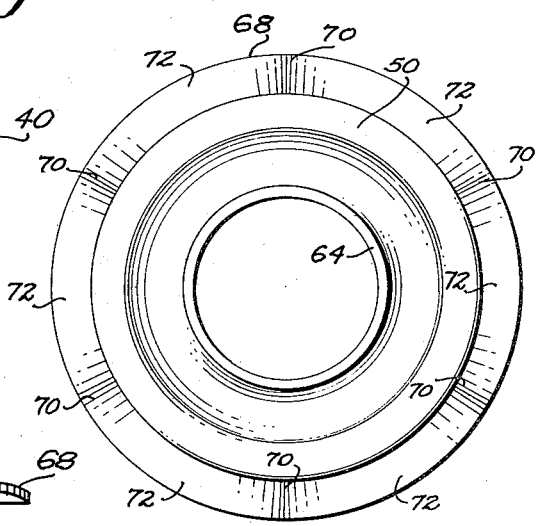
Fig. 3 is an enlarged bottom view of the diaphragm follower.
Figure 4:
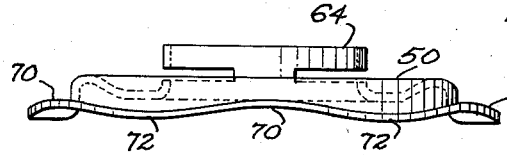
Fig. 4 is an enlarged side view of the diaphragm follower.
Figure 5:
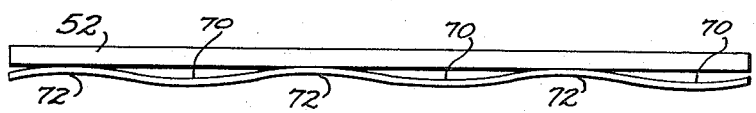
Fig. 5 is a partial developed view of the flange of the diaphragm follower and the marginal edge portion of the associated diaphragm.

For the purpose of reducing or eliminating the foregoing effects, the invention provides a novel diaphragm follower 50 which is provided with a hub 64 which surrounds and slidably engages the enlarged portion 60. Preferably, the enlarged portion 60 has a metal sleeve 66 thereon so as to facilitate sliding movement of the hub 64 on the portion 60 of the diaphragm. As shown more particularly in Figs. 3, 4 and 5, the follower 50 is also provided with a flange or seat 68 which is corrugated or waved to form a plurality of low and high areas 70 and 72 respectively, the high areas 72 being in constant contact with the marginal edge 52 and the low areas 70 being spaced below the edge 52 when the parts occupy the normal non-energized position shown in Fig. 2. With such an arrangement, it will be readily understood that the portions of the marginal edge 52 which lie above the low areas 70 will be deflected downwardly, upon the application of compressed air to the inlet chamber 46, due to the flexibility of such marginal edge. Thus compressed air will bleed into the outlet chamber 58 and to the the front brake chambers 16 through the spaced openings formed by the deflected portions of the edge 52 which engage the low areas 70, and the pressures above and below the diaphragm will be equalized. As the pressure above the diaphragm 46 builds up, the marginal edge 52 is deflected away from the seat 54 to complete communication between the inlet and outlet chambers 56 and 58.

It is believed that the operation of the invention will be readily understood from the foregoing description. Assuming that the parts occupy the non-energized position shown in Fig. 2, as soon as the valve 14 of Fig. 1 is operated, compressed air will be simultaneously conducted to the rear brake chambers 18 and to the inlet chamber 56 of the quick release valve 30. Due to the flexibility of the diaphragm 46, the enlarged central portion 60 thereof will move downwardly to contact the seat 62 and thus close communication between the front brake chambers 16 and the atmospheric exhaust 36. Communication between the inlet chamber 56 and the outlet chamber 58 will then be established by way of the openings formed by the portions of the marginal edge 52 of the diaphragm 46 which are deflected downwardly to seat upon the low areas 70 of the flange 68 of the diaphragm follower 50. Thus compressed air will be conducted to the front brake chambers 16 and during this initial phase of the operation, the pressures across the diaphragm are equalized.

As the pressure above the diaphragm builds up, the remaining portions of the marginal edge 52 are deflected away from the inlet seat 54 and free communication is established between the brake valve 14 and the front brake chambers 16 and the rate of build-up of pressure in the front brake chambers and the degree of application of the front brakes is substantially the same as that of the rear brakes. In the event that it is desired to hold the brakes in applied position, the brake valve 14 is moved to the holding or lapped position. When this occurs, the spring 48 moves the edge 52 into seating engagement with the seat 54 while the portion 60 is maintained in contact with the seat 62. However, the portions of the edge 52 which engage the low areas 70 will not return to the seat 54 until the pressures across the diaphragm are equal, thus assuring that the rear and front brakes are applied to the same degree. The valve 30 is then in the holding or lapped position.

Upon release of the control valve 14, it will be readily understood that the pressure above the diaphragm 46 drops to atmospheric pressure. During this action the higher pressure beneath the diaphragm causes the central portion thereof to be moved upwardly to move the portion 60 off the seat 62 and thus connect the front brake chambers 16 with the outlet opening 36 by way of connections 42 and 44, the outlet ports 38 and 40 and the outlet chamber 58. Thus the diaphragm 46 functions as a unidirectional flow check valve in the control of the fluid pressure actuation of the front brake chambers 16.

From the foregoing it will be readily seen that the provision of the diaphragm follower 50 and the novel corrugated construction of the flange 68 thereof materially reduces or eliminates any pressure differential across the diaphragm 46 of the quick release valve during charging of the front brake chambers. This action assures that the front and rear brake chambers of the vehicle will be substantially simultaneously actuated and to substantially the same degree, thus eliminating the differential actions inherent in the prior braking systems.

While the invention has been illustrated herein and described with considerable particularity, it will be readily understood by those skilled in the art that various modifications may be resorted to without departing from the spirit of the invention. Reference will therefore be had to the appended claims for a definition of the limits of the invention.

What is claimed is:

1. A quick release valve for compressed air brake systems, comprising a casing having inlet, outlet and exhaust ports, a flexible diaphragm within the casing for controlling communication between the inlet and outlet ports and between the outlet and exhaust ports, said diaphragm being free from initial flexure, a spring constantly urging a portion of the diaphragm to a position to interrupt communication between the inlet and outlet ports, and a spring seat interposed between the spring and diaphragm, said spring seat having a continuous peripheral portion provided with spaced-apart areas engaging said diaphragm and also provided with other spaced-apart areas between the first named areas spaced from the diaphragm.

2. A quick release valve for compressed air brake systems, comprising a casing having inlet, outlet and exhaust ports, a flexible diaphragm within the casing for controlling communication between the inlet and outlet ports and between the outlet and exhaust ports, said diaphragm being imperforate and free from initial flexure, and being provided with an enlarged portion for controlling said exhaust port, a spring constantly urging a portion of the diaphragm to a position to interrupt communication between the inlet and outlet ports, and a corrugated spring seat interposed between the spring and diaphragm, said spring seat having a hub portion slidable on said enlarged portion.

3. A quick release valve for compressed air brake systems, comprising a casing having inlet, outlet and exhaust ports, a flexible diaphragm within the casing having an enlarged central portion for controlling communication between the outlet and the exhaust ports and having a marginal portion for controlling communication between the inlet port and the outlet port, and being free from initial flexure, a spring within the casing to normally urge said marginal portion into contact with a portion of said casing to control communication between the inlet port and the outlet port, and a spring follower having a hub slidably engaging said central portion and being provided with a flange interposed between said marginal portion of the diaphragm and said spring, said flange being corrugated to provide a plurality of successive raised and depressed portions.

4. A quick release valve for compressed air brake systems, comprising a casing having aligned inlet and exhaust ports and a plurality of laterally extending outlet ports, a flexible diaphragm within the casing dividing the latter into inlet and outlet chambers, said diaphragm being free from initial flexure and having an enlarged central portion normally spaced from the exhaust port to establish free communication between the outlet ports, the outlet chamber and the exhaust port, said diaphragm being provided with a marginal portion for controlling communication between the inlet and outlet chambers, a spring interposed between the casing and said marginal portion and normally effective to maintain said marginal portion in engagement with a part of the casing to interrupt communication between the inlet and outlet chambers so that initial application of compressed air to said inlet port and inlet chamber will move said enlarged part to close the exhaust port prior to deflection of said marginal portion against the action of said spring to connect the inlet and outlet chambers upon increase in pressure of the compressed air supplied to said inlet chamber, and means for decreasing the pressure differential across the diaphragm comprising a spring follower having an annular corrugated seat interposed between the spring and the marginal portion of the diaphragm, said follower having a hub surrounding said enlarged central part and being slidable thereon.

5. A quick release valve for compressed air brake systems, comprising a casing having inlet, outlet and exhaust ports, a flexible diaphragm within the casing for controlling communication between the inlet and outlet ports and between the outlet and exhaust ports, said diaphragm being free from initial flexure, a spring constantly urging a portion of the diaphragm to a position to interrupt communication between the inlet and outlet ports, and means cooperating with said diaphragm for obtaining equal pressures above and below the diaphragm during application of compressed air to said inlet port, said means including a part having spaced-apart areas engaging the under side of the diaphragm and also having other spaced-apart areas between the first-named areas spaced from said under side of the diaphragm.

References Cited in the file of this patent

UNITED STATES PATENTS

| | | |
|---|---|---|
| 1,967,418 | McPhail | July 24, 1934 |
| 2,040,580 | Vorech | May 12, 1936 |
| 2,487,415 | Bennett | Nov. 8, 1949 |